United States Patent [19]

Swager

[11] Patent Number: 4,896,989
[45] Date of Patent: Jan. 30, 1990

[54] LOCKABLE, PIN-RETAINING COUPLING

[76] Inventor: William E. Swager, P.O. Box 750, Fremont, Ind. 46737

[21] Appl. No.: 69,162

[22] Filed: Jul. 2, 1987

[51] Int. Cl.$^4$ .............................................. F16B 21/00
[52] U.S. Cl. ..................................... 403/154; 403/326; 59/86
[58] Field of Search ............... 403/326, 155, 154, 109, 403/405.1, 377, 157; 285/321, 318; 59/86, 85

[56] References Cited

U.S. PATENT DOCUMENTS

| 2,623,399 | 12/1952 | Barrett | 285/321 X |
| 2,757,942 | 8/1956 | Eberhart | 285/321 X |
| 2,760,831 | 8/1956 | Kirk et al. | 285/321 X |
| 2,847,238 | 8/1958 | Bolling, Jr. | 403/154 |
| 4,068,960 | 1/1978 | Swager | 403/20 |
| 4,102,124 | 7/1978 | Swager | 403/154 X |
| 4,145,874 | 3/1979 | Müller et al. | 59/86 |
| 4,184,783 | 1/1980 | Hall | 403/157 |
| 4,630,958 | 12/1986 | McCallister | 403/405.1 X |
| 4,706,367 | 11/1987 | Garringer | 403/109 X |
| 4,733,987 | 3/1988 | Tomlinson et al. | 403/326 |
| 4,762,024 | 8/1988 | Graft | 403/326 X |

Primary Examiner—Andrew V. Kundrat
Assistant Examiner—Peter M. Cuomo
Attorney, Agent, or Firm—Hill, Van Santen, Steadman & Simpson

[57] ABSTRACT

A lockable, pin-retaining coupling comprising a clevis having a bore extending therethrough and a pin slidably positioned within the bore. A brake restrains movement of the pin within the bore. Stops adjacent opposite ends of the pin prevents the pin from being removed from the bore.

2 Claims, 4 Drawing Sheets

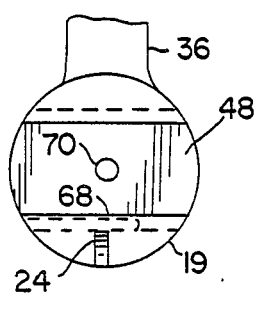
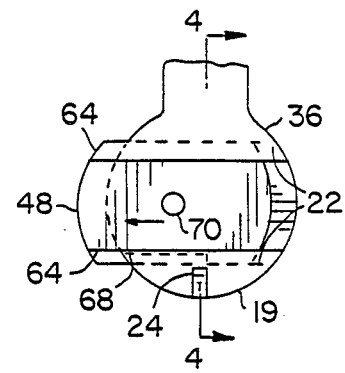
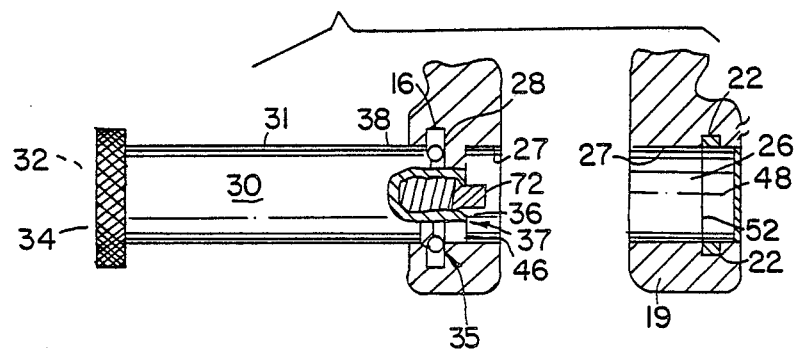

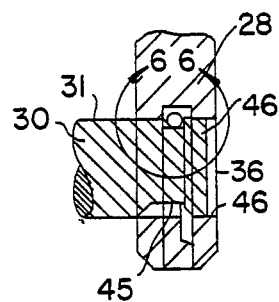
FIG. 5
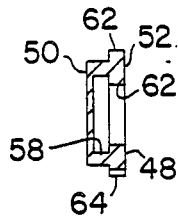
FIG. 10
FIG. 8
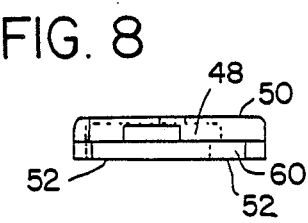
FIG. 11
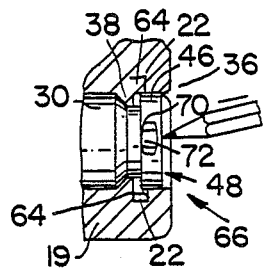
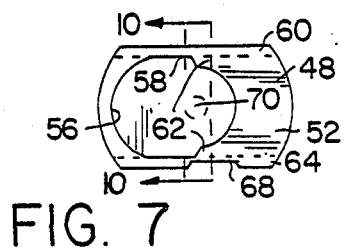
FIG. 14
FIG. 7
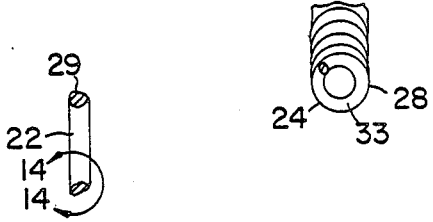
FIG. 13
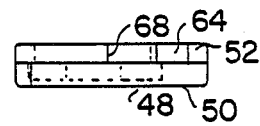
FIG. 9

LOCKABLE, PIN-RETAINING COUPLING

BACKGROUND OF THE INVENTION

The present invention generally relates to couplings for use with load-lifting devices and safety restraints such as cables, chains, and ropes and, more particularly, is concerned with a lockable, pin-retaining coupling which remains securely locked until released, and once released is held in the released position without regard to its orientation to the vertical, and in which the component parts are not subject to disassembly and subsequent loss.

The ability to transfer a load from a lifting device such as a hoist or derrick or crane without concern for the loss of component parts of the coupling device is important in industrial settings such as factories and quarries, and in construction.

Similarly, individuals requiring tethers to safety equipment while engaged in hazardous sports or occupations such as mountain climbing or window washing require a coupling which is easily and quickly operable, without fear of losing parts, without fear of either uncoupling during use or closing and becoming coupled before being attached to the necessary equipment.

Present couplings in use take the form of elongated links which close either by latching upon pins or close by means of a threaded nut, and are subject to being distorted or sprung out of shape while in use, thus making the locking or securing portions of these couplings inoperable. The couplings become unsafe under these circumstances.

Other couplings are held together by threaded nuts which require the use of wrenches and which often vibrate loose while in use.

In one general type of coupling the pin is simply held in position by a cotter pin or clamp which often becomes lost in usage. In another general type, pin locking means have been complex and uneconomical to manufacture or otherwise are overly bulky and undesirable in use.

U.S. Pat. No. 4,068,960 discloses a clevis and pin style coupling which remains latched in the closed position.

It is therefore highly desirable to provide an improved coupling and an improved locking means for a load bearing pin.

It is also highly desirable to provide an improved coupling having a pin, a clevis and a retractable latch to hold the pin in position.

It is also highly desirable to provide an improved coupling having a pin, clevis and a brake restraining the movement of the pin within the clevis when the pin is in other than a fully engaged position.

It is also highly desirable to provide an improved coupling having a clevis and a pin with stops which prevent the pin from being removed from the clevis.

It is also highly desirable to provide a relatively simple, economical and safe locking means for a load bearing pin.

It is also highly desirable to provide an improved coupling having a clevis and a pin with both a latch to prevent inadvertent opening of the coupling and a brake to prevent inadvertent movement of the pin within the clevis.

It is also desirable to provide an improved coupling with these features by economical, maintenance free and readily available mechanical means with a minimum of mechanical parts and with a minimum of fabrication required on the parts in a mechanically simple structure which is convenient to use.

It is also highly desirable to provide an improved coupling which may be coupled and uncoupled by untrained users, conveniently, without the use of tools.

It is also highly desirable to provide a coupling which when open will remain open despite its orientation and will not be closed prematurely due to the force of gravity.

It is also highly desirable to provide an improved coupling and load bearing pin assembly which has all of the above-identified features.

SUMMARY OF THE INVENTION

It an object of the invention to provide an improved coupling and an improved locking means for a load bearing pin.

It is another object of the invention to provide an improved coupling having a pin, a clevis and a retractable latch to hold the pin in position.

It is yet another object of the invention to provide an improved coupling having a pin, clevis and a brake restraining the movement of the pin within the clevis when the pin is in other than a fully engaged position.

It is still another object of the invention to provide an improved coupling having a clevis and a pin with stops which prevent the pin from being removed from the clevis.

It is yet another object of the invention to provide a relatively simple, economical and safe locking means for a load bearing pin.

It is still another object of the invention to provide an improved coupling having a clevis and a pin with both a latch to prevent inadvertent opening of the coupling and a brake to prevent inadvertent movement of the pin within the clevis.

It is yet another object of the invention to provide an improved coupling with these features by economical, maintenance free and readily available mechanical means with a minimum of mechanical parts and with a minimum of fabrication required on the parts in a mechanically simple structure which is convenient to use.

It is still another object of the invention to provide an improved coupling which may be coupled and uncoupled by untrained users, conveniently, without the use of tools.

It is yet another object of the invention to provide a coupling which when open will remain open despite its orientation and will not be closed prematurely due to the force of gravity.

It is still another object of the invention to provide an improved coupling and load bearing pin assembly which has all of the above-identified features.

In the broader aspects of this invention there is provided a lockable, pin-retaining coupling comprising a clevis having a bore extending therethrough and a pin slidably positioned within the bore. A brake restrains movement of the pin within the bore. Stops adjacent opposite ends of the pin prevents the pin from being removed from the bore.

BRIEF DESCRIPTION OF THE DRAWINGS

The above mentioned and other features and objects of this invention and the manner of obtaining them will become more apparent and the invention itself will be better understood by reference to the following description of the embodiment of the invention taken in conjunction with the accompanying drawings wherein:

FIG. 2 is an end view of the second leg taken substantially along Line 2—2 of FIG. 1 showing the latch body in its latched position;

FIG. 3 is an end view of the second leg like FIG. 2 showing the latch body in its unlatched position;

FIG. 4 is a fragmentary cut-away view partially in cross-section of the pin and clevis showing details of the pin in the fully opened position;

FIG. 5 is a fragmentary sectional view of the pin and clevis showing details of the collar, the collar receptacle, and the pin's groove;

FIG. 7 is a bottom plan view of the latch body;

FIG. 8 is a side view of the latch body shown in FIG. 7 from one side;

FIG. 9 is a side view of the latch body shown in FIG. 7 from the other side;

FIG. 10 is a sectional view of the latch body taken substantially along the section line 10—10 of FIG. 7;

FIG. 11 is a cut-away view partically in cross-section of the second leg of the clevis showing release of the spring biased rod which holds the latched body in the fully latched position;

FIG. 13 is a sectional view of the collar taken substantially through the collar's axis and perpendicular to the collar's plane; and FIG. 14 is a detail, cut-away view of one specific embodiment of the collar.

DESCRIPTION OF A PREFERRED EMBODIMENT

Figure 1:
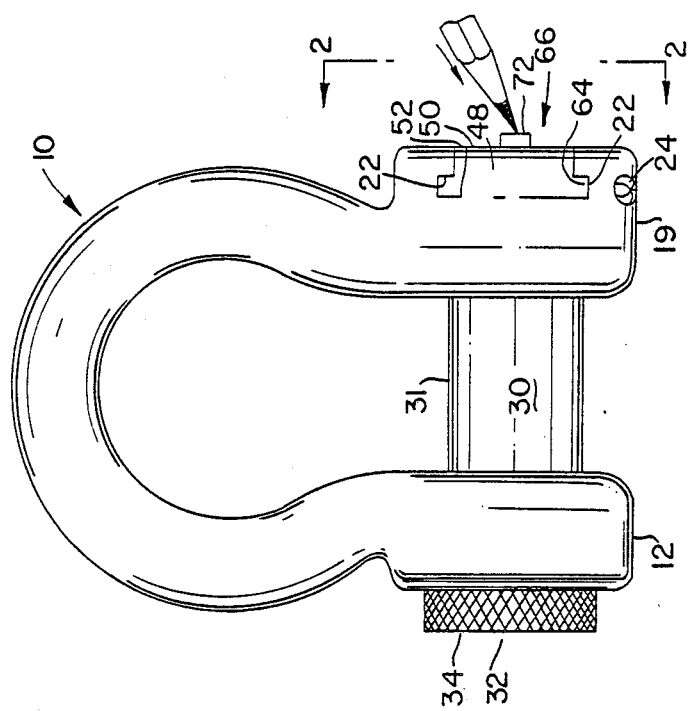
FIG. 1 is an assembly drawing showing the clevis, its two legs, the pin inserted in the fully closed position, and a slidable latch body in the second leg.

The invention provides a coupling to be used for attaching loads in a readily transferable manner to lifting devices such as cranes, hoists, and derricks. There is likewise provided a coupling to be used with safety equipment by those in sports and industry such as mountain climbers and window washers. The coupling may be readily and safely utilized without regard to the level of the mechanical ability of the users, and without the requirement of tools or equipment for releasing or engaging the coupling. The coupling comprises a pin and clevis, the clevis having first and second legs, each of the legs having a bore therethrough, the bore being co-axial and having cylindrical surfaces, the bores being adapted to slidably receive the pin, the pin having first and second ends and first and second stops at the respective ends, the pin having a cylindrical surface, the second leg having a latch, the latch holding the pin in position within said bores of the first and second legs when the latch is engaged with the pin, the pin being retractable from the bore of the second leg when the latch is not engaged with the pin, a brake, the brake restraining movement of the pin within the bores, the stops preventing the pin from being retractable from the bore of the first leg. A groove in the second end of the pin cooperates with the latching mechanism when the coupling is in the coupled position and cooperates with the retainer when the pin is in the fully opened position. A collar contained within a receptacle in the first leg's bore is wedged between the face of the groove and opposite face of the receptacle.

The collar may be of a common stretchable material such as either a polymer or a coiled spring, being stretched about the pin. In the restraining position the retainer occupies the groove at the end of the pin.

An advantage to use of this collar is that it contacts the groove about the groove's circumference rather than at a single point as does the retaining means of U.S. Pat. No. 4,068,960. Another advantage to the use of the collar is that a wide variety of sizes are commercially available. Depending upon the spring constant desired and the coefficient of friction of the collar's surface, a manufacturer has a wide latitude in selecting collars for different sizes of pins. The collar acts as a brake, preventing the pin's moving to the fully opened or to the fully closed position until the user is ready. It has been possible for a conventional pin to accidently slip fully open due to the force of gravity pulling the pin downward. It likewise has been possible for a pin to close itself, due to gravity. This tendency of couplings to either open or close before the operator is ready is not only annoying but is also a safety hazard. Those relying upon the coupling as a safety device frequently have only one hand available for use in operating the coupling, and thus would appreciate the braking feature of the claimed invention which keeps the pin from accidently opening or closing and which does not require the use of both of the operator's hands to maintain the fully opened position. The braking action of the collar upon the pin's surface likewise allows the pin to be only partially opened, thus keeping the coupling in contact with existing attachments to chains, ropes, cables, and the like, all without fear that the pin might accidentally fully open allowing everything to fall.

The braking effect of the collar may be altered by varying the spring constant of the collar, by selecting a collar whose surface finish has a greater or lesser coefficient of friction, and by specifying that surface finishes on the pin and the walls of the collar receptacle be either smoother or rougher, thereby changing the coefficient of friction on the surfaces. In some embodiments it is possible to design the components such that the collar rolls along the pin's surface while in other designs it is possible for the collar to slide along the pin's surface.

Referring to FIG. 1, a two legged clevis 10 is shown having a first leg 12, a second leg 19, and a pin 30. Pin 30 is shown in the fully closed position. Latch body 48 is shown, as is spring-biased rod 72 preparatory to depression by a pencil point.

Figure 6:
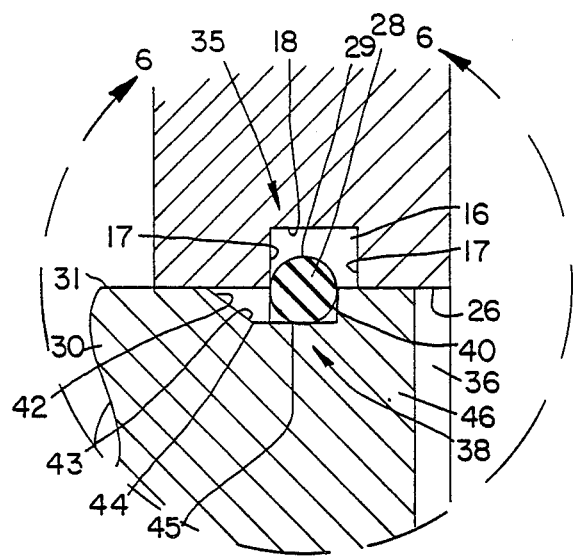
FIG. 6 is an enlarged view of the detail shown in FIG. 5, again in cross section, illustrating the co-operation of the collar, the pin groove, and the collar receptacle in the fully opened position.

Referring now to FIGS. 4 through 6, pin 30 is shown in the fully retracted position, being fully withdrawn from the second leg 19 of the clevis 10, and held in place by retainer 35 comprising collar 28, contained within groove 38 and disk-shaped collar receptacle 16 within pin 30 and bore 26, respectively. Receptacle 16 comprises spaced-apart walls 17, and a cylindrical face 18 disposed between walls 17. Bore 26 extends through first and second legs 12 and 19. Bore 26 has a cylindrical surface 27. Collar 28 has a toroidal surface 29.

Pin 30 has a cylindrical surface 31 and a first end 32 on which is a first stop 34, which in a specific embodiment may be an enlarged knob. Retainer 35 cooperates with second pin end 36 on which is located a second stop 37 comprising groove 38 and shoulder 40.

As is detailed in FIG. 6, groove 38 and shoulder 40 define ramp 42. Ramp 42 has an incline 43 and a base 44. Base 44 encircles pin 30 to form neck 45. Head 46 is formed on second pin end 36 by shoulder 40. In a specific embodiment not shown ramp base 44 may be a single point at the intersection of incline 43 with shoulder 40.

Collar 28 is shown encircling neck 45 and wedged between shoulder 40 and opposite receptacle wall 17. Pin 30 is disposed within bore 26, pin surface 31 being slidable with bore cylindrical surface 26.

Collar 28 is a non-compressible, but expandable toroid having a surface 29. In a specific embodiment, collar 28 may apply a radial force to neck 45. Disk-shaped collar receptacle 16 has a major diameter such as to accomodate fully collar 28 when collar 28 has been forced about pin surface 31 when pin 30 is in other than the fully opened position. Receptacle walls 17 are separated by bottom face 18 sufficiently to accomodate the axial thickness of torodial collar 28.

The radial distance from cylindrical surface 27 of bore 26 to face 18 of receptacle 16 may be equal to or greater than the axial thickness of collar 28, and the distance in the same direction from pin surface 31 to base 44 of ramp 42 may be from about one-quarter to about three-quarters of the axial thickness of collar 28. By maintaining these dimensions there will exist a clearance between collar 28 and face 18 which allows collar 28 to operate frictionally against only one of walls 17, shoulder 40, ramp 42, pin surface 31 and bore surface 27 and either free from interference with face 18 or in engagement with face 18. Face 18 may be conveniently shaped to accomodate collar 28 and both face 18 and walls 17 may be spaced to engage collar 28 when collar 28 is on pin surface 31 if additional frictional forces are required. In one specific embodiment, face 18 is cylindrical in cross-section. Face 18 may also take the form of a fillet or a V-shaped groove in other specific embodiments not shown. Collar 28 and those surfaces engaging collar 28 can also be provided with friction-increasing surfaces if desired.

Figure 12:
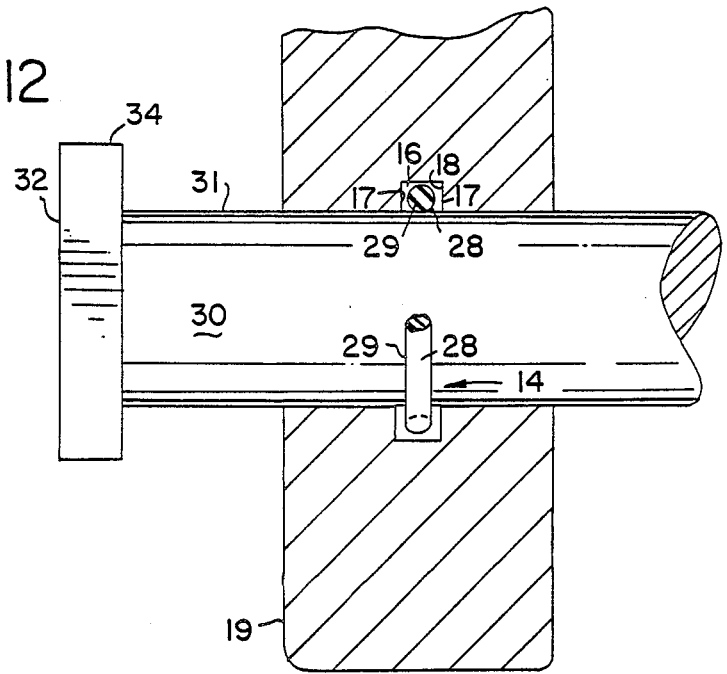
FIG. 12 is a cut-away view of the first leg detailing the braking action of the pin's surface, the collar, and the collar receptacle.

Groove 38 profiles neck 45 and encircles the second end 36 of pin 30. Groove 38 has a shoulder 40 plunging downward and a ramp 42 comprising incline 43 and base 44. Ramp base 44 may have a width equal to or greater than the axial thickness of collar 28 as illustrated in FIG. 6. In other specific embodiments not shown, incline 43 abuts shoulder 40 directly and base 44 will be a single point turned on end 36. Ramp 42 encircles pin 30 and acts to stretch collar 28 outwardly about pin surface 31 when pin 30 is moved toward the closed position and away from the fully opened position. In operation, collar 28 is urged outwardly and is stretched upon surface 31 as shown in FIG. 12. Collar 28 is held between walls 17. Being thus contained, collar 28 acts upon pin surface 31 either frictionally or by a rolling action to brake the motion of pin 30 within bore 26, being thus restrained from motion relative to pin 30.

FIG. 13 is a sectional view of collar 28 showing torodial surface 29. FIG. 14 is a cut-away view showing one specific embodiment of collar 28 where the toroid is a coil 33.

Braking action of brake 14 is created by the action of collar 28 on receptacle 16 and the spaced apart walls 17 of the receptacle 16, and pin surface 31. Collar 28 frictionally engages at least one of the spaced apart walls 17 and is stretched about pin surface 31 to create brake 14. In a specific embodiment, collar 28 may engage face 18 and/or both walls 17. Collar 28 applies radial force to surface 31 of the pin while being retained in receptacle 16. Friction sliding movement between collar 28 and pin 30, and between collar 28 and receptacle walls 17 and/or face 18 restrains movement of pin 30 through bore 26. Pin surface 31, face 18 and the receptacle walls 17 may have their surface finishes varied to be either smoother or coarser depending upon the coefficient of friction desired. Likewise, the surface 29 of collar 28 may be varied to alter its coefficient of friction. Thus, tailoring of the components may be achieved such that collar 28 either rolls or slides along pin surface 31.

Collar 28, because of its encircling character, provides uniform resistance across surface 31 of pin 30, as opposed to existing couplings utilizing a single point retaining means, which because of its very nature concentrates pressure at a single point promoting scratching and scoring of the pin. Collar 28 also acts to center pin 30 within bore 26 allowing ease of operation when compared with existing single point devices which tend to urge the pin against one side of the bore only, making for difficulty in alignment.

FIG. 1 shows pin 30 in the fully closed position. At the first end 32 is a first stop 34, shown in one specific embodiment as being enlarged and in the form of a knob. When pin 30 has been fully closed in clevis 10, first stop 34 prevents pin 30 from further movement and acts to locate pin 30 such that latch body 48 can engage second pin end 36. As As shown in FIGS. 1 and 11, latch body 48 has projecting tracks 64 which complement channel slots 22 located in second leg 19 of clevis 10.

FIGS. 1, 2, 3 and 7 through 11 show the structure of latch body 48 to contain an inner-surface 52, an outer-surface 50, projecting tracks 64, and slot 54. Slot 54 has an open, circular first end 56 which accomodates head 46. Latch 66 comprises latch body 48 which, in addition to having outer 50 and inner surfaces 52, is guided by upper and lower projecting tracks 64. On latch body 48 an overhang 62 exists in the region between inner surface 52 and undercut portions 58 and 60 of slot 54. Projecting tracks 64 extend from latch body 48 in the form of a "T". Tracks 64 complement upper and lower transverse channel slots 22 positioned within second leg 19. Inner surface 52 has a slot therein. An open region of the slot 56 accomodates head 46 of pin 30. Overhang 62 is complementary with neck 45 on second end 36 of pin 30. Overhand 62 engages second pin end 36 when latch body 48 is in the latched position and prevents pin 30 from being retracted from second end 36 of clevis 10. Overhang 62 disengages second pin end 36 when latch body 48 is in the unlatched position allowing pin 30 to be retracted from second leg 19 of clevis 10.

In operation, as latch body 48 slides, the undercut, longitudinal central portion 58 moves over shoulder 40, over head 46, and comes to rest with undercut, disk-shaped second end 60 of slot 54 cupping neck 54 of pin 30. Overhand 62 cups neck 45 and latches pin 30 in the fully closed position. Hole 70 accomodates a spring biased rod 72 in order to lock latch body 48 and prevent it from accidentally moving from other than the fully latched position. Rod 72 may be depressed by any convenient, common instrument, such as the pencil point shown in FIGS. 1 and 11. The second leg 19 and latch 66 are also disclosed in U.S. Pat. No. 4,068,960 and that disclosure is incorporated hereby by reference.

In one specific embodiment shown in FIGS. 2 and 3, latch body 48 contains recess 68, which recess accomodates detent 24 in order to prevent the removal of latch body 48 from second leg 19. Second leg 19 has a detent 24 which allows latch 66 to travel slidably from the latched position to the unlatched position. Detent 24 holds latch body 48 within second leg 19 preventing loss. Detent 24 may be of any conventional and well known designs such as a set screw, key, or pin. In specific embodiments not shown, latch body 48 may be urged into the latched position by a conventional spring.

Because of the grave safety dangers involved in a coupling's inadvertently coming loose, the present invention employs three redundant safety measures. Before opening, spring biased rod 72 must be depressed. While being depressed, latch body 48 must be withdrawn, and finally pin end 30 must be axially urged toward the open position against action of brake 14.

Furthermore, because of the action of brake 14 the coupling mentioned will not accidently close itself, even when pin 30 is oriented in an upright position subject to gravitational forces downward. When in the fully open position an axial force must be imparted to pin 30 sufficient to force collar 28 outwardly on ramp 42. Even then the aforementioned action of brake 14 prevents pin 30 from dropping into the closed position. Brake 14 has the additional safety advantage of preventing pin 30 from accidentally sliding and pinching a user's hand between enlarged end 34 and first leg 12.

The disadvantage of conventional couplings which employ safety devices which are either threaded or of a hook and latch nature, which safety devices are subjected directly to load bearing forces, is that over time stresses deform the safety features. This disadvantage is overcome by the instant invention. Groove 38 only comes in contact with collar 28 and latch body 48, neither of which is subjected to load bearing forces. Likewise, rod 72 has its only contact with hole 70 of latch body 48, and is never subjected to load bearing stress.

While there has been described above the principles of the invention in connection with a specific coupling device, it is to be clearly understood that this description is made only by way of example and not as a limitation to the scope of the invention.

What is claimed is:

1. A coupling comprising a pin, a clevis, said clevis having first and second legs, each of said legs having a bore therethrough, said bores being coaxial and having cylindrical surfaces, said bores being adapted to slidably receive said pin, said pin having first and second ends and first and second stops at said respective ends, said pin having a cylindrical surface, said second leg having a latch, said latch holding said pin in position within said bores of said first and second legs when said latch is engaged with said pin, said pin being retractable from said bore of said second leg when said latch is not engaged with said pin, a brake, said brake restricting movement of said pin within said pin bores, said stops preventing said pin from being retractable from said bore of said first leg, wherein said latch comprises a latch body having outer and inner surfaces, upper and lower projecting tracks, and an overhang, said inner surface having a slot therein, said slot comprising an open, circular first end, an undercut longitudinal central portion, and an undercut disk-shaped second end, said overhang being defined by the region between said inner surface and the surface of said undercut portions of said slot, upper and lower transverse channel slots positioned within said second leg, said projecting tracks slidably positioned within said channel slots, said latch body being slidable within said second leg, said overhang engaging said second pin end when said latch body is in the latched position thereby preventing said pin from being retracted from said second end, said overhang disengaging said second pin end when said latch body is in the unlatched position thereby allowing said pin to be retracted from said second leg, wherein said second stop includes a groove, a ramp, and a head, wherein said ramp comprises a base and an incline, said head and groove define a shoulder, said shoulder plunges from said cylindrical pin surface to said base of said ramp, said incline angles away from said base and head and crests at said cylindrical surface of said pin, said base forms a neck about said pin, wherein said coupling has a retainer comprising said shoulder, a disk-shaped collar receptacle within said first leg bore, said collar receptacle having spaced walls and a face disposed between said walls, a toroidal-shaped collar is diametrically expandable in tension within said receptacle and pin groove, said pin shoulder and facing receptacle wall wedging said collar therebetween when said pin is retracted to the fully open position thereby retaining said pin within said first leg, and wherein said collar surrounds said base when said pin is in the fully retracted position, and said ramp stretches said collar outwardly to said cylindrical pin surface when said pin is urged in the direction of the closed position, said walls restrain said collar from movement relative to said first leg.

2. The coupling of claim 1 wherein said collar is a coil.

* * * * *